United States Patent
Wardell, Jr. et al.

[11] Patent Number: 5,511,596
[45] Date of Patent: Apr. 30, 1996

[54] QUICK CHANGE DEBARKING CHAIN

[75] Inventors: Myron H. Wardell, Jr., Lititz, Pa.;
Phillip Schmidt, Tacoma, Wash.

[73] Assignee: Cooper Industries, Inc., Houston, Tex.

[21] Appl. No.: 390,388

[22] Filed: Feb. 16, 1995

[51] Int. Cl.$^6$ .................................................. B27L 1/00
[52] U.S. Cl. ..................... 144/208.J; 59/78; 59/85; 144/208 R; 144/341
[58] Field of Search ............................ 144/208 R, 208.J, 144/2.Z, 341, 343; 59/84, 85, 86, 78, 85

[56] References Cited

U.S. PATENT DOCUMENTS

| | | | |
|---|---|---|---|
| 4,063,583 | 12/1977 | Rieger et al. | 59/93 |
| 4,572,258 | 2/1986 | Mischel | 144/208.J |
| 5,343,912 | 9/1994 | Chronister et al. | 144/341 |
| 5,419,379 | 5/1995 | Schmidt | 144/208.J |

*Primary Examiner*—W. Donald Bray
*Attorney, Agent, or Firm*—Burns, Doane, Swecker & Mathis

[57] ABSTRACT

A rotor link attached to a debarking cylinder. An open link is attached to the rotor link and a chain is attached to the open link. The open link must be rotated forward in the direction of rotation of the debarking cylinder so that a flat area of the rotor link is presented adjacent the open area of the open link. This makes it less likely that the link will be disengaged by random movement of the chain during a debarking operation. Thus, individual chains can be removed without removal of the attachment rod and all the chains on the cylinder. A second chain may be attached to the open link through a similar series of translational and rotational movements.

6 Claims, 7 Drawing Sheets

QUICK CHANGE DEBARKING CHAIN

BACKGROUND OF THE INVENTION

This invention pertains to chains in general and in particular to chains used for removing the bark from logs by flailing or beating.

Chains attached to rotating drums or cylinders have proven to be an efficient means for removing bark from trees. However, these chains wear out quickly because of high stress from repeatedly striking wood and must be replaced frequently.

The present method of attaching the chains to the drum is to slip one link of the chain into a slot or hole in the drum and slide a rod through an opening in the drum parallel to the drum axis and through the chain link. A problem with this is that a number of chains are attached to each drum and not all of the chains may need to be replaced at the same time. Also the attachment rod itself may become deformed during use and it may be difficult to insert the rod through the drum when reattaching the new chain.

Changing flail chains is labor intensive and usually requires a two man crew. A man in the flail chamber positions new and rearranged chains in the rotor holes. A second man, on the outside of the flail debarker, reinserts the attachment rods through a small opening in the drum. Communication between the two men is necessary to avoid finger injuries. A two man crew can change and rearrange chains in about 30–45 minutes.

A major drawback to this chain servicing system is that not all the chains will normally need to be changed or rearranged. Flail chains also wear at different rates depending on their position on a rotor. Usually the chains attached to the center half of the drum will wear twice as fast as the chains attached near the end. The standard chain servicing system requires the attachment rods to be pulled completely out of the rotor to service the chains at the end of the rotor. Therefore, all the chains in a row have to be handled and reinserted in the rotor holes, even though some may be in good condition.

An additional problem with the debarking apparatus presently in use is that chains must be discarded before they are completely worn out. A new nine link chain may be used until it has lost an end link. The service crew may then flip the chain to wear the other end until it has lost two more links. The chain is then discarded because it is too short to effectively debark logs; however, it still has 5–6 good links.

SUMMARY OF THE PRESENT INVENTION

In the present invention, an open link is attached to the rotor link and the rotor link is then attached to a debarking cylinder in a conventional manner. A chain is then attached to the open link. To attach the chain, the open link must be rotated forward in the direction of rotation of the debarking cylinder so that a flat area of the rotor link is presented adjacent the open area of the open link. This makes it less likely that the link will be disengaged by random movement of the chain during a debarking operation. Individual chains can be removed without removal of the attachment rod and all the chains on the cylinder. A second chain may also be attached to the open link through a similar series of movements.

DETAILED DESCRIPTION OF THE INVENTION

Figure 1:
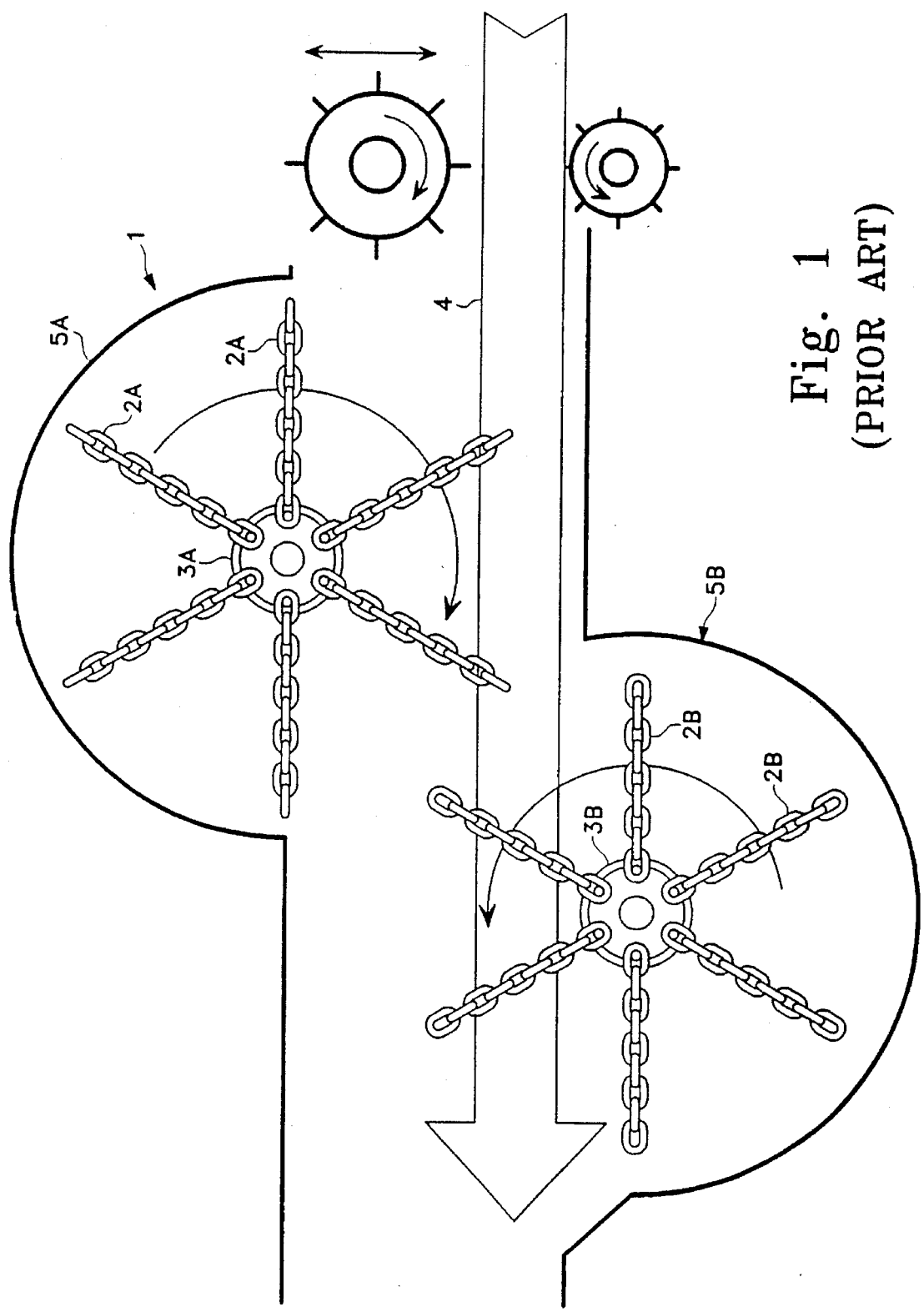
FIG. 1 shows a side view of debarking chains attached to rotating debarker drums.

A chain flail debarker of the type presently used in the industry is shown in FIG. 1. It is designated in general by numeral 1 and includes a clockwise rotating drum sometimes called a cylinder or rotor, 3A, and a counterclockwise rotating drum, 3B. Drums 3 use chains 2 attached to counter-rotating drums 3 to beat the bark off of logs 4 being passed lengthwise between drums 3. Flail housings 5A and 5B provide protection from broken pieces of chain and bark.

Figure 2:
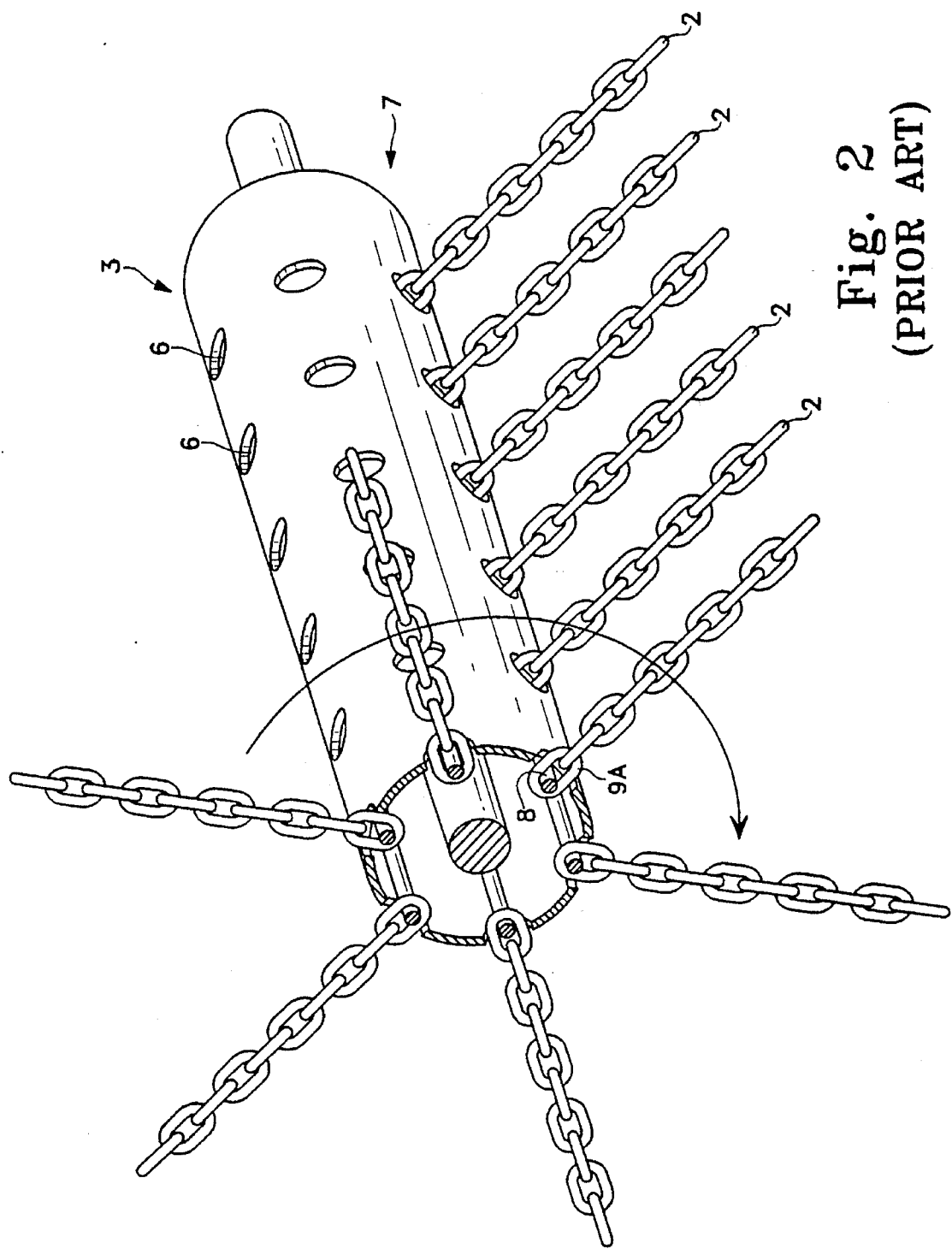
FIG. 2 shows a perspective view, partially cut away, of a debarking flail apparatus.

A typical prior art drum 3 shown in more detail in FIG. 2 is usually a 10" to 12" diameter steel tube with ¾" to 1¼" thick walls, and is 3–4 feet in length. A drum typically has six evenly spaced rows 7 of holes 6 along its length. Each row 7 usually has seven or eights holes 6. The chains 2 are attached by inserting one end of the chain through a hole or slot 6 and passing a steel rod 8 through the end link 9A of the chain 2. A single rod 8 attaches all the chains 2 in a given row 7 on the rotor 3. The holes 6 are usually large enough to allow for installation of a single or double chain to be attached side by side in a single hole 6.

The number of chains 2 installed in a prior art flail debarker 1 will vary with flail design and debarking conditions. One design has 27 chain attachment holes 6 on each of its two drums 3. Another flail design has 45 holes per drum 3. Tree bark is more easily removed in the spring and summer than in the fall and winter. Most flail debarkers need only a single chain per hole to debark logs in the summer while two chains 2 per hole 6 are needed in the winter. Some debarkers can accommodate up to 288 flail chains.

A typical flail chain 2 is a length of standard ⅝" diameter wire, grade 7, transport load binding chain, or grade 8, lifting chain. Each flail debarker design requires a specific maximum length chain. For example, one debarker 1 used in the industry requires a nine link flail chain 2 that is 18 inches in overall length.

Figure 3:
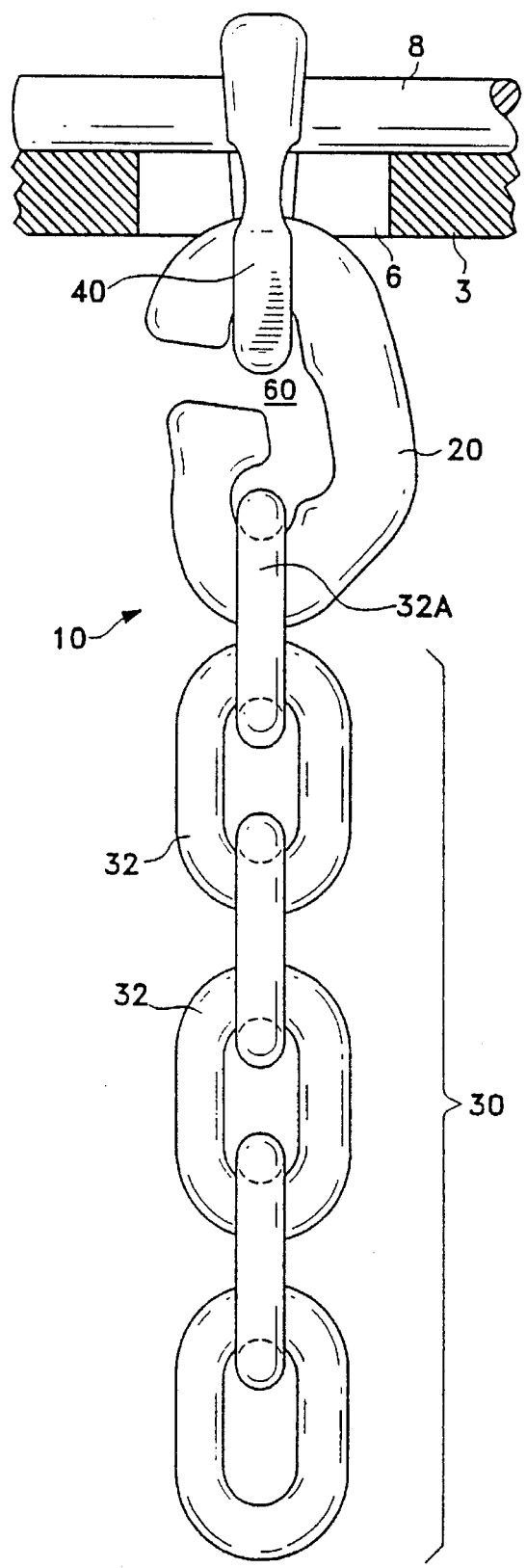
FIG. 3 is a front view of a chain according to the present invention attached to a flail drum. The drum portion is shown as a section through a rotor hole lengthwise along the rotor.
Figure 4:
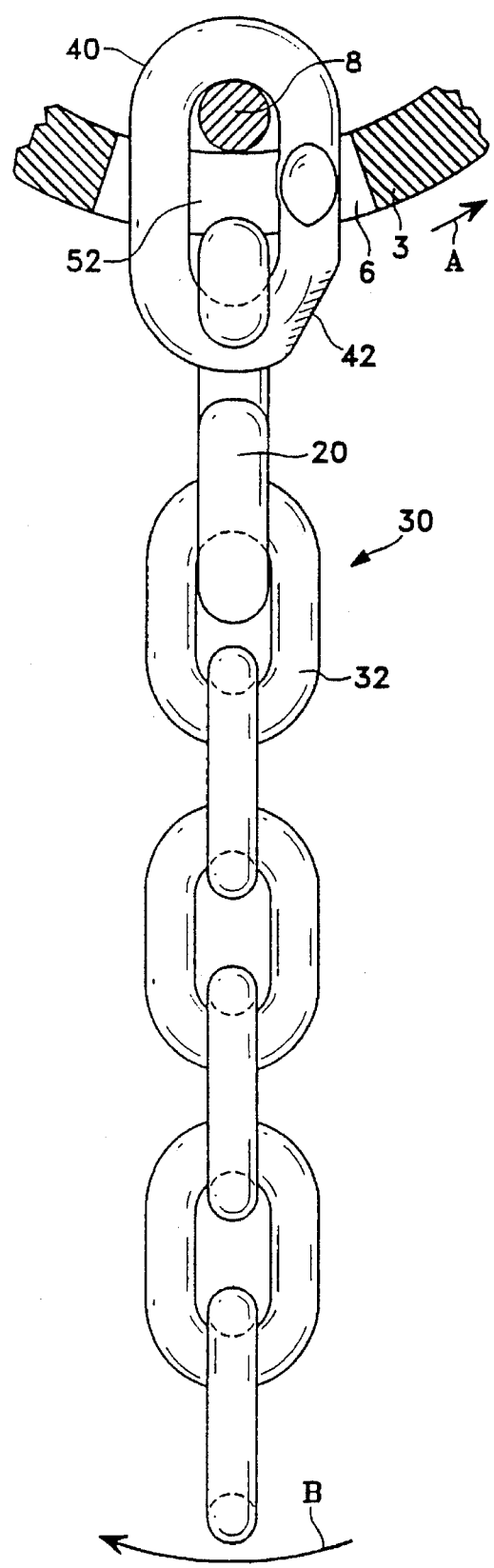
FIG. 4 is a side view of a chain according to the present invention attached to a flail drum. The attachment rod is shown as a cross section through the diameter of the drum and a rotor hole.

Referring now to FIG. 3 and FIG. 4 a debarking chain according to the present invention is referred to in general by numeral 10. The main components of debarking chain 10 are open link 20, closed link chain 30, and rotor link 40.

The quick change fitting, also referred to as an open link 20 is a forged alloy steel link that is roughly in the shape of the letter G. The working chain 30 is suspended from the bottom of the open link 20. The open link 20 is suspended from a connecting link sometimes also referred to as a rotor or base link 40 that has been inserted in hole 6 in drum 3. Attachment rod 8 has been inserted through the upper end of the interior opening 52 of the base link 40. The base link 40 is secured by and suspended from the attachment rod 8. The interior aperture 60 of the open link 20 can accommodate one base link 40 and one or more working chains 30. An open link could accommodate several flails. Arrow A shows the direction of rotation of cylinder 3. Arrow B shows the direction of movement of chain 30 after striking a log during the debarking process.

Figure 6:
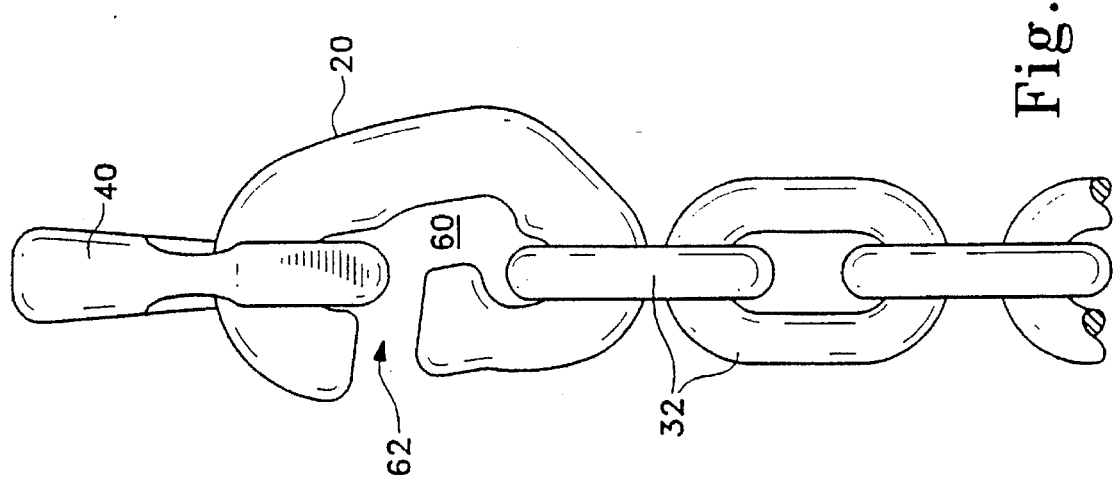
FIG. 6 shows a perspective view of a debarking chain according to the present invention with the claim in the interference position.
Figure 5:
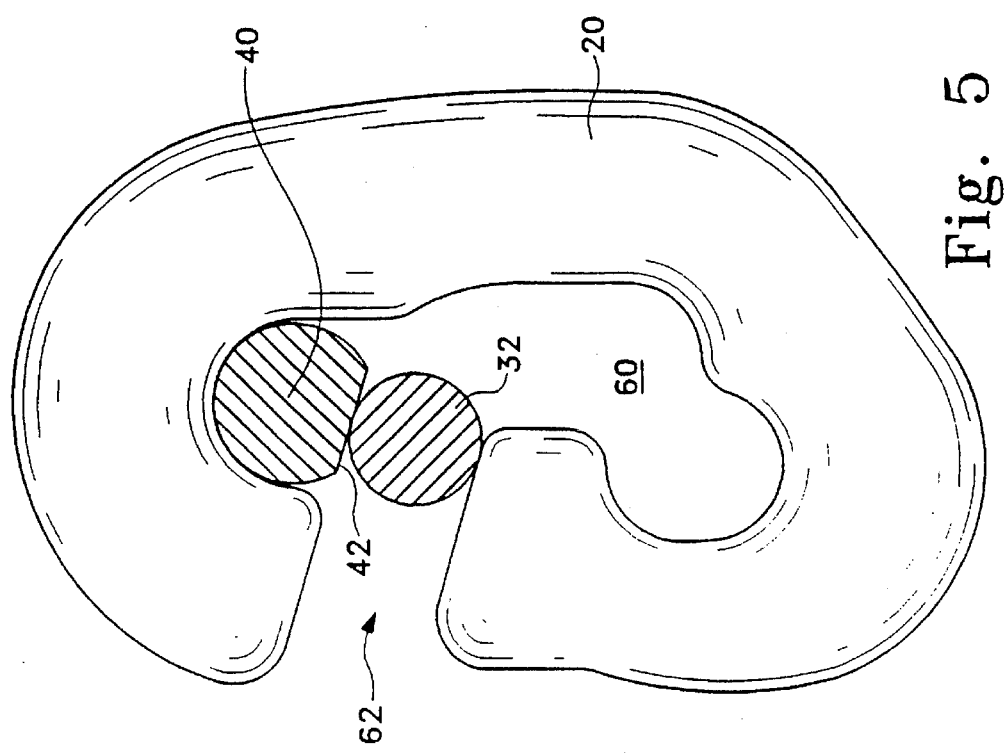
FIG. 5 is a perspective view partially in cross section showing the open link moved forward to align a flat section of the rotor link.
Figure 7:
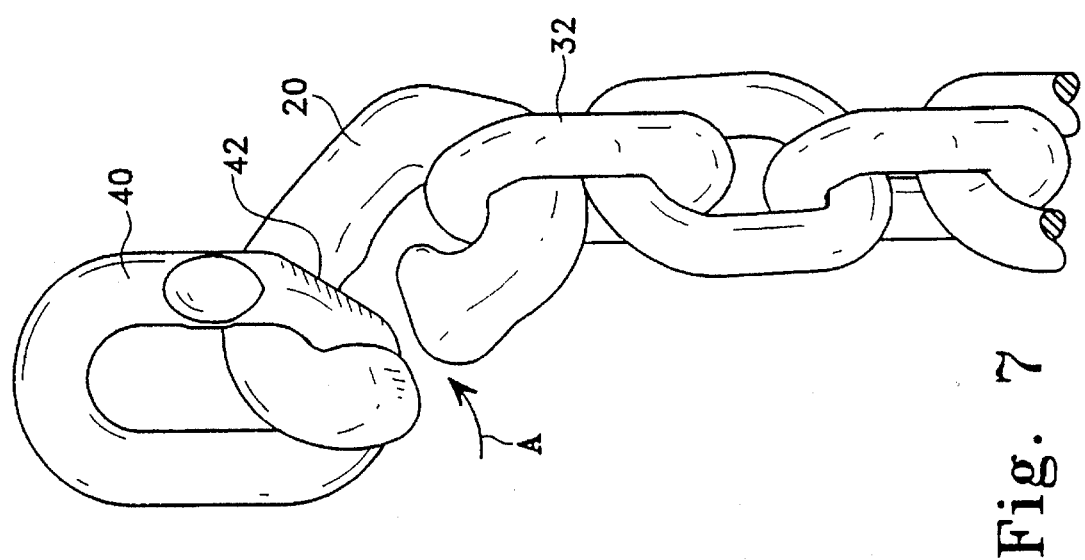
FIG. 7 shows a perspective view of a chain according to the present invention with the open link moved forward in the direction of rotation of the debarking cylinder prior to removal of the chain from the open link.

Referring now to FIGS. 5 and 7, open link 20 has been rotated forward in the direction of rotation of drum 3. This operation exposes flat area 42 of rotor link 40 allowing link 32 of chain 30 to pass through an opening 62 formed in one side of the open link 20 and into the interior section 60 open link 20. FIG. 6 shows base link 40 in an interference position, with link 40 blocking cross sectional area 62 so that link 32 cannot pass.

Figure 8:
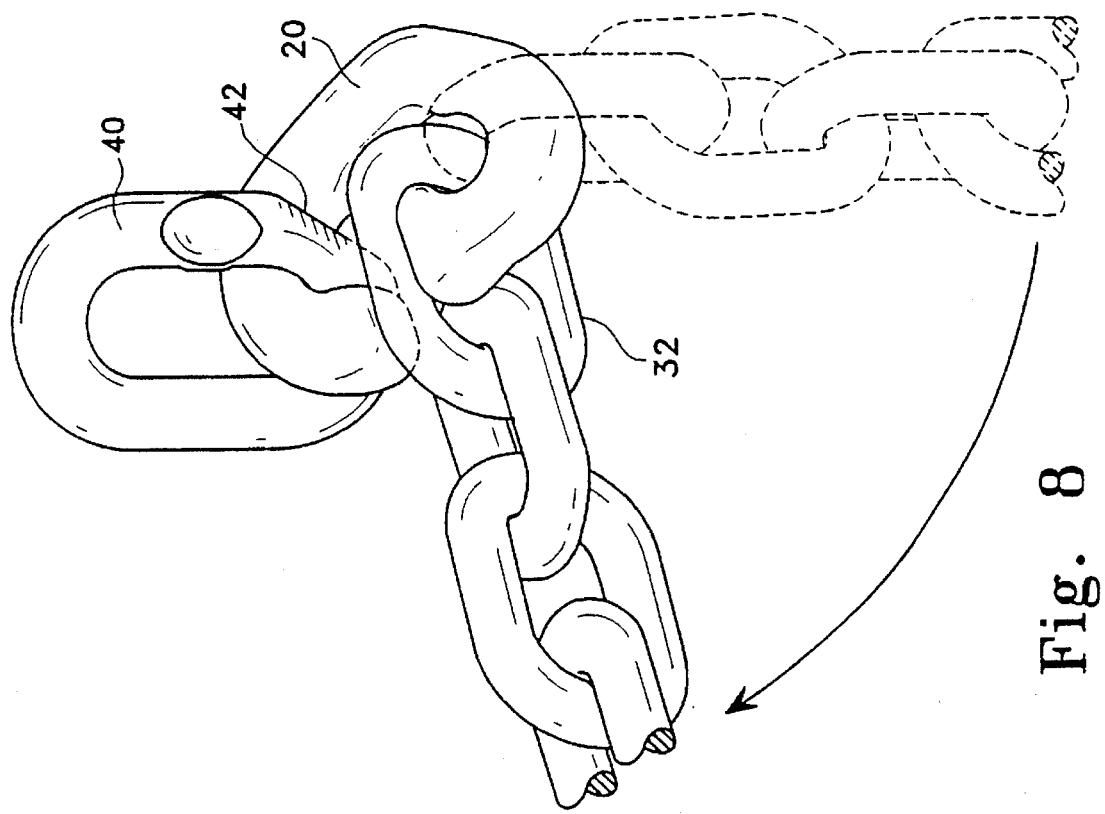
FIG. 8 shows a perspective view of a chain according to the present invention in which the chain has been moved to the open area of the open link prior to removal.
Figure 9:
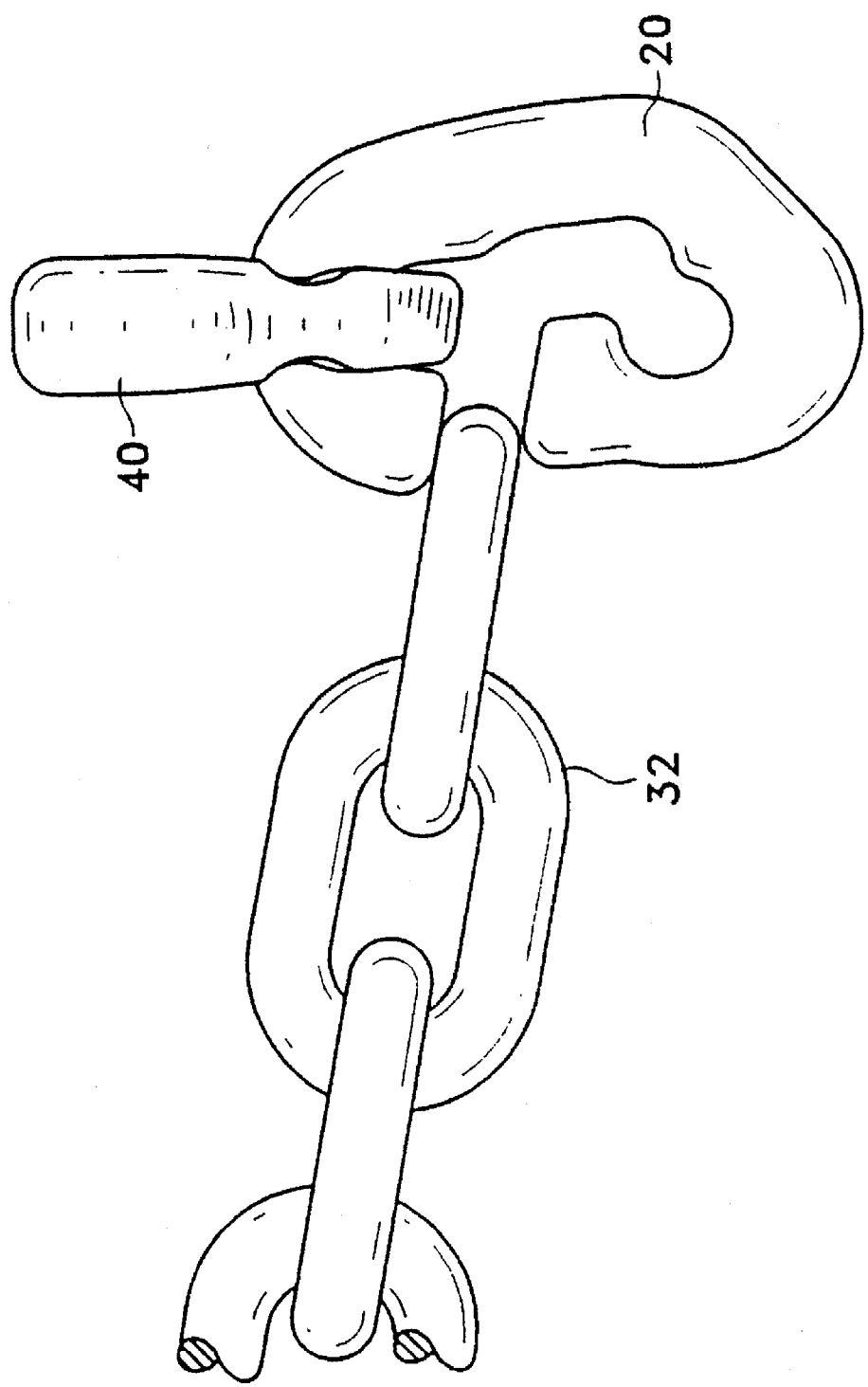
FIG. 9 shows a perspective view of a chain according to the present invention wherein the link of the chain has been removed from the open link.

FIG. 7, 8 and 9 show this operation more clearly. Rotor link 20 is moved or tilted in the direction of rotation of drum 3 allowing chain 30 to be moved to a disengaging position and removed as shown at FIG. 8 and 9.

Figure 10:
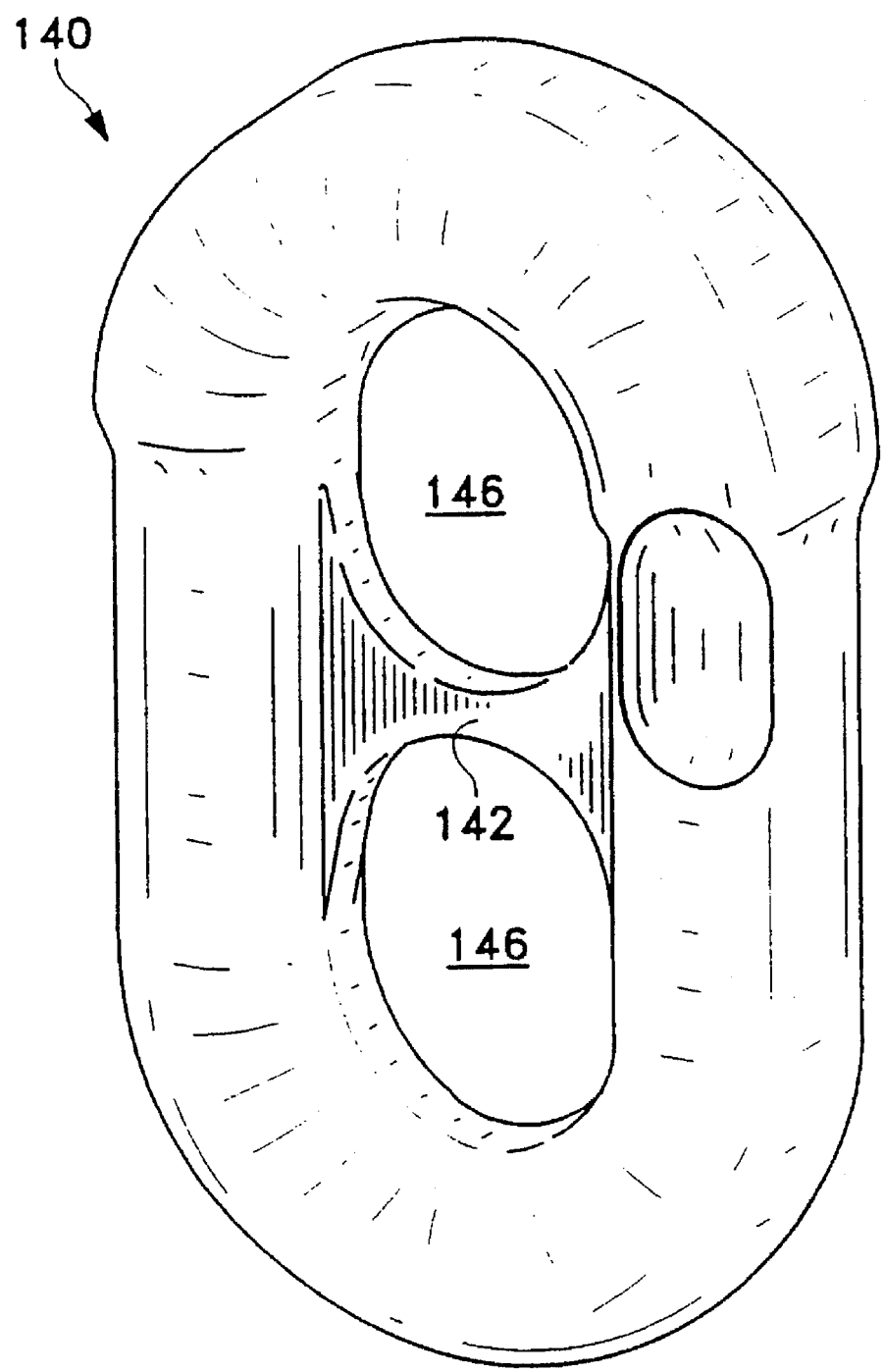
FIG. 10 shows a plan view of a webbed rotor link according to the present invention.

A rotor link can be forged in the shape of a chain link with a single inside opening as described above. The rotor link can also be fabricated with a web connecting the two barrels in the center of the link as shown in FIG. 10. A link 140 with a web 142 would have an opening 146 at each end of the link; an opening for the rotor rod and an opening for the open link. This web adds both torsional and tensile strength to the link without increasing the exterior dimensions of the link. Because forgings require a flash line, the cost to provide a web to the rotor link is no more than a link without a web. Web thickness allows the open link to be assembled at the reduced cross section, coined area, then translated to the bottom of the rotor link.

We claim:

1. In a debarking apparatus comprising a rotor and a plurality of debarking chains mounted to said rotor, each debarking chain comprising:

an open link defining an interior space and forming an opening leading into said interior space;

a chain comprised of closed links, at least an end-most one of said closed links having a cross-sectional area approximately equal to a cross-sectional area of said opening; and a rotor link mounted to said rotor and to said open link, said rotor link having an interior space whose cross-sectional area prevents said end-most closed link of said chain from passing through said opening when said rotor link and said open link are in a first relative orientation, occurring during normal operation of said apparatus;

wherein said rotor link having a flat section which is alignable with said opening of said open link in a second relative orientation of said rotor link and said open link to allow passage of said endmost closed link through said opening into said interior space of said open link.

2. A debarking chain as in claim 1 wherein said open link is forged.

3. A debarking chain as in claim 1 further including a rod for attaching said rotor link to the rotor.

4. A debarking chain as in claim 1 wherein said rotor link has an interior web.

5. A debarking chain as in claim 1 wherein said terminal end cross section is approximately equal to the minimum cross section of said closed link.

6. A quick-disconnect debarking chain for attachment to a rotor, said debarking chain comprising:

an open link defining an interior space and forming an opening leading into said interior space; a chain comprising closed links interconnected to one another, at least an end-most one of said closed links being slidable through said opening and into said interior space; and a rotor link including one end attachable to a rotor, and another end mounted within said interior space, a first section of said second end being positionable adjacent said opening in a first orientation of said rotor link relative to said open link and configured to prevent travel of said end-most link through said opening, and a second section of said second end being positionable adjacent said opening in a second orientation of said rotor link relative to said open link and configured to permit travel of said end-most link through said opening.

* * * * *